United States Patent
Marshall et al.

(10) Patent No.: US 9,404,248 B1
(45) Date of Patent: Aug. 2, 2016

(54) SEWAGE STOPPER SYSTEMS

(71) Applicants: Delvin Marshall, Baltimore, MD (US); Tremaine Dansbury, Baltimore, MD (US)

(72) Inventors: Delvin Marshall, Baltimore, MD (US); Tremaine Dansbury, Baltimore, MD (US)

(*) Notice: Subject to any disclaimer, the term of this patent is extended or adjusted under 35 U.S.C. 154(b) by 292 days.

(21) Appl. No.: 14/252,210

(22) Filed: Apr. 14, 2014

Related U.S. Application Data

(60) Provisional application No. 61/846,978, filed on Jul. 16, 2013.

(51) Int. Cl.
  *F16K 15/03* (2006.01)
  *E03F 7/04* (2006.01)

(52) U.S. Cl.
  CPC . *E03F 7/04* (2013.01); *F16K 15/03* (2013.01); *Y10T 137/7856* (2015.04); *Y10T 137/7857* (2015.04); *Y10T 137/7903* (2015.04)

(58) Field of Classification Search
  CPC ..... E03F 7/04; F16K 15/03; Y10T 137/7856; Y10T 137/7857; Y10T 137/7903
  See application file for complete search history.

(56) References Cited

U.S. PATENT DOCUMENTS

| | | | | |
|---|---|---|---|---|
| 194,676 | A * | 8/1877 | Hansen | E03F 7/04 137/409 |
| 539,680 | A * | 5/1895 | Godfrey | F16K 15/03 137/270 |
| 1,354,879 | A * | 10/1920 | Boland | F16K 15/03 137/389 |
| 2,928,410 | A * | 3/1960 | Del Vecchio | E03F 7/04 137/115.02 |
| 4,074,686 | A | 2/1978 | Kessel | |
| 5,285,816 | A * | 2/1994 | Herlihy | F16K 15/03 137/527.8 |
| 2004/0250863 | A1* | 12/2004 | Atkeson | F16K 15/031 137/855 |
| 2009/0071552 | A1* | 3/2009 | Kelly | E03D 11/10 137/527 |
| 2011/0132474 | A1 | 6/2011 | Reese et al. | |

* cited by examiner

*Primary Examiner* — Mary McManmon
*Assistant Examiner* — Frederick D Soski
(74) *Attorney, Agent, or Firm* — RG Patent Consulting, LLC; Rachel Gilboy

(57) ABSTRACT

A sewage backflow assembly of sewage stopper systems is a check valve designed to operate with low flows such as is found in sewage drain pipes. The check valve disc is light weight plastic and easily lifts when outgoing flow is present but closes when backflow occurs to prevent flooding of building structures. The device has an inlet pipe segment, a flapper housing with a flapper, and an outlet pipe segment. The sewage backflow assembly may be glued into a pipe using glue type slip couplers or may be installed using re-useable pipe clamps.

20 Claims, 5 Drawing Sheets

SEWAGE STOPPER SYSTEMS

CROSS-REFERENCE TO RELATED APPLICATION

The present application is related to and claims priority from prior provisional application Ser. No. 61/846,978, filed Jul. 16, 2013 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of sewage backflow prevention devices and more specifically relates to a sewage stopper system.

2. Description of the Related Art

Modem homes usually have multiple piping systems that enter and exit the home. According to Perry's Chemical Engineers' Handbook, industrial piping is defined as "a system of tubes used to convey fluids from one location to another." Early American piping systems were created primarily of wood, notably in the West, where durable redwood material was readily available. Today, industrial process piping is manufactured from a variety of materials such a fiberglass, glass, steel, aluminum, plastic, copper, and concrete. Perhaps the best known use for piping is plumbing, which, in addition to providing water supplies to homes and businesses, also serves to dispatch sewage waste.

While most residential piping enters the home and terminates, at least one piping system is like a continuation of another. For example, fresh potable water enters a house so that it can be used for washing clothes, bathing, drinking, cleaning, watering plants, and removing human waste. The majority of this water, after being used, becomes unsanitary and must be removed from the residence. The piping systems that remove the dirty water are called sewer systems.

Unlike potable water lines, sewer systems are not under pressure. They rely on gravity to drain the water from the business or residence all the way to the treatment plant. To accomplish this, the piping system must be installed on a 1½% downhill gradient, or drop approximately ¼ inch for every 10 linear feet. This allows the water to flow in the downhill direction but not so fast that the water velocity is faster than the solids that it is carrying. If the water runs faster, the solids stay behind and create a plug in the pipe. This shallow slope creates a delicate balance between flowing and not flowing. It doesn't take very much to upset this balance either. Crews for utility systems, out of necessity, work daily making repairs, unplugging clogged sewer mains, and doing preventative maintenance for these pipes. When a sewer main does become clogged, the sewer backs up in the system and flows out at the first available openings. These openings are usually sewer manhole covers, but are often the drains and toilets of residences. When this happens, the extremely pathogenic environment that is created necessitates the evacuation of the home until a complete sanitary cleanup and repairs to structures have been made. The volume of sewer water that overflows into the residence is only limited by the response time of the utility repair crews. Check valves are mostly unsuitable to stop overflows because the pressure required to open them is not present in sewer systems. A need exists for an inexpensive, easy to install, and reliable method to prevent sewage backflows into residences.

Various attempts have been made to solve the above-mentioned problems such as those found in U.S. Pat. No. 1,354,879 to Harry Bolajtd et al, U.S. Pub. No. 2011/0132474 to James T. Reese et al; and U.S. Pat. No. 4,074,686 to Bernhard Kessel. This art is representative of sewage backflow prevention means. None of the above inventions and patents, taken either singly or in combination, is seen to describe the invention as claimed.

Ideally, a sewage backflow prevention device should provide reliability and ease of installation, and yet, would operate reliably and be manufactured at a modest expense. Thus, a need exists for a reliable sewage stopper system to avoid the above-mentioned problems.

BRIEF SUMMARY OF THE INVENTION

In view of the foregoing disadvantages inherent in the known sewage backflow prevention art, the present invention provides a novel sewage stopper system. The general purpose of the present invention, which will be described subsequently in greater detail, is to provide reliability, ease of installation, and low cost.

The present invention, sewage stopper systems, as disclosed herein, preferably comprises a sewage backflow assembly having an inlet pipe segment with a first end and a second end, an inlet-pipe-outer-periphery, and a flapper housing having a top side and a bottom side, a first opening having a first-opening-inner-periphery, a second opening having a second opening inner periphery, a flapper comprising a flapper disc and a flapper hinge tab, and an outlet pipe segment having a proximate end, a distal end, and an-outlet-pipe-outer-periphery.

The sewage backflow assembly is able to be installed concentrically in line with a sewage drain pipe to prevent an unintended backflow of sewage water into the interior of a building. The sewage backflow assembly may be about 5 inches in diameter, about 14 inches in length, and about 4 inches in width and is designed fit into a residential or commercial building sewage line that carries waste water away from the building. The second end of the inlet pipe segment is non-removably inserted into the first opening of the flapper housing with the inlet-pipe-outer-periphery frictionally and non-removably contacting the first-opening-inner-periphery. The pieces may be adhesively slid together using a primer and bonding cement, or can be joined using thermal adhesion from the manufacturer. The inlet pipe segment and the outlet pipe segment preferably each comprise a circular cross-section manufactured in standard pipe sizes such that the sewage backflow assembly can be easily installed using standard size couplers.

The exterior of the end of the flapper housing having the first opening is flat on the top side and semi-circular on the bottom side. The exterior of the end of the flapper housing having the second opening is flat on the top side and semi-circular on the bottom side and the central portion of the flapper housing may comprise a flat bottom side and a flat top side. The first end of the inlet pipe segment is integral with the inlet pipe segment and the second end, the first end at an opposing end from the second end. The top side of the flapper housing is oriented upwardly and opposite from the bottom side of the flapper housing, the top side and the bottom side being integral with each other and with the first opening and the second opening of the flapper housing. The central portion of the flapper housing preferably comprises a U-shaped cross-section.

The flapper hinge tab and the flapper disc are integral with the outer circumference of the flapper disc transversely located within an inner diameter of the flapper housing. The flapper is easily and rotatably-lifted via sewage water flowing from the inlet end toward the outlet end which opens a cylindrical channel via the lifted flapper, to allow the sewage water to flow through the sewage backflow assembly. The flapper hinge tab of the flapper has a hinge portion which is flexible and allows the flapper disc to rotate in relation to the flapper hinge tab. The outer circumference of the flapper disc is able to rotate freely and upwardly within the inside volume of the flapper housing. The flapper disc comprises a second contact face and the second end of the inlet pipe segment comprises a first contact face. The second contact face hingedly rotates downwardly to contact-seal against the first contact face. The first contact face of the inlet pipe segment and the second contact face of the flapper disc are parallel planar in a sealed position and non-parallel planar in a non-sealed position. The first contact face of the inlet pipe segment may be cut at a slight angle having the bottom of the cut extending further into the flapper housing than the top of the cut to ensure that the weight of the flapper disc closes against the first contact face in a static condition.

The flapper hinge tab is frictionally and non-removably located between the inlet-pipe-outer-periphery of the inlet pipe segment and the first-opening-inner-periphery of the first opening of the flapper housing. The outer periphery of the proximate end of the outlet pipe segment is non-removably inserted within the second-opening-inner-periphery of the flapper housing. The distal end of the outlet pipe segment is at the opposite end from the proximate end. The first end of the inlet pipe segment and the distal end of the outlet pipe segment are coupled inline to the sewage drain pipe such that flowing sewage water enters through the first end of the inlet pipe segment of the sewage backflow assembly and exits the through the distal end of the outlet pipe segment. The device may be used for various sized pipes.

The sewage backflow assembly is able to be adhesively and non-removably installed into a sewage drain pipe. The sewage backflow assembly can be installed into an existing sewage line by cutting out an equal length piece of existing pipe and coupling the sewage backflow assembly in place of the removed piece, making sure to orient the inlet end and the outlet end properly according to flow direction. The sewage backflow assembly may be fabricated from PVC plastic or may be fabricated from ABS plastic allowing the user to use glued slip-joint couplers to install. The sewage backflow assembly may also be removably coupled within the sewage drain pipe using re-usable, clamp tightening, pipe couplers. The sewage backflow assembly is useful for installing in-line within the sewage drain pipe and preventing backflow of sewage water from the sewage drain pipe into the interior of a residential or commercial building.

A kit is embodied herein for sewage stopper systems that preferably comprises at least one fully assembled sewage backflow assembly and at least one set of user installation instructions.

The present invention holds significant improvements and serves as a sewage stopper systems. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, sewage stopper systems, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a sewage backflow prevention device, and more particularly, to a sewage stopper system as used to improve reliability, ease of installation, and reduced costs.

Generally speaking, the sewage backflow assembly of sewage stopper systems is a check valve designed to operate with low flows and no pressure such as is found in sewage drain pipes. The check valve disc is light weight plastic and easily lifts when outgoing flow is present but closes when backflow occurs to prevent flooding of building structures. The device has an inlet pipe segment, a flapper housing with a flapper, and an outlet pipe segment. The sewage backflow assembly may be glued into a pipe using glue type slip couplers or may be installed using pipe clamps.

Figure 1:
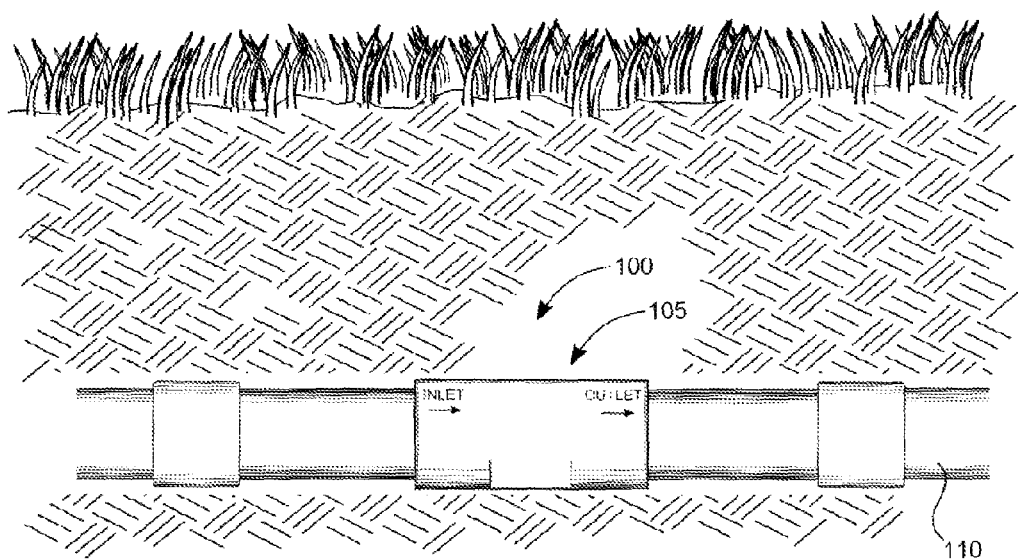
FIG. 1 shows a perspective view illustrating an in-use condition of sewage stopper systems according to an embodiment of the present invention.

In greater detail now, referring to the drawings by numerals of reference, there is shown in FIG. 1, a perspective view illustrating an in-use condition of sewage stopper systems 100 according to an embodiment of the present invention.

Sewage backflow assembly 105 is useful for installing in-line within sewage drain pipe 110 and preventing backflow of sewage water from sewage drain pipe 110 into the interior of a residential or commercial building. Sewage backflow assembly 105 is able to be adhesively and non-removably installed into sewage drain pipe 110. Sewage backflow assembly 105 can be installed into an existing sewage drain pipe 110 by cutting out an equal length piece of existing sewage drain pipe 110 and coupling sewage backflow assembly 105 in place of the removed piece, making sure to orient inlet end 120 and outlet end 130 properly according to flow direction. Sewage backflow assembly 105 may be fabricated from PVC plastic or may be fabricated from abs plastic allowing the user to use glued slip-joint couplers to install. Sewage backflow assembly 105 may also be removably coupled within sewage drain pipe 110 using re-usable, clamp tightening, pipe couplers.

Easily installed into any septic or sewage drain pipe 110, sewage backflow assembly 105 may allow users with very little plumbing experience to eliminate the common problem of waste-back-up and high plumbing bills. As a result, household consumers may be able to take care of the installation jobs themselves, without the need to request the services of a plumbing and clean-up professionals which is a significant cost saving to users who would have experienced such an event.

Individuals on fixed incomes and tight budgets may certainly benefit from this great advantage. Additionally, sewage backflow assembly 105 may prevent the arduous clean up that invariably results from backed-up sewage. Yet, even the professionals could benefit from employing a product such as sewage backflow assembly 105 in their endeavors. Taken along on jobs, especially to commercial buildings and businesses with extensive drainage problems, sewage backflow assembly 105 may allow plumbers to remedy sewage back-up problems in an expedient and convenient manner. Sewage backflow assembly 105 is constructed of resilient materials and may provide a long service life.

Figure 2:
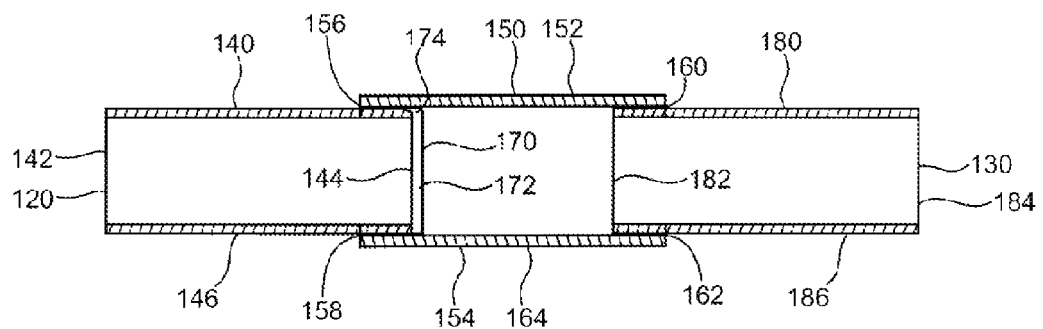
FIG. 2 is a side cutaway view illustrating an open position of the sewage stopper systems according to an embodiment of the present invention of FIG. 1.

Referring now to FIG. 2, a side cutaway view illustrating an open position of sewage stopper systems 100 according to an embodiment of the present invention of FIG. 1.

Sewage backflow assembly 105 may have inlet pipe segment 140 with first end 142 and second end 144, inlet-pipe-outer-periphery 146, and flapper housing 150 having top side 152 and bottom side 154, first opening 156 having first-opening-inner-periphery 158, second opening 160 having second opening inner periphery 162, flapper 170 comprising flapper disc 172 and flapper hinge tab 174, and outlet pipe segment 180 having proximate end 182, distal end 184, and outlet-pipe-outer-periphery 186.

Sewage backflow assembly 105 is able to be installed concentrically in line with sewage drain pipe 110 to prevent an unintended backflow of sewage water into the interior of a building. Sewage backflow assembly 105 may be about 5 inches in diameter, about 14 inches in length, and about 4 inches in width and is designed fit into a residential or commercial building sewage drain pipe 110 that carries waste water away from the building. Second end 144 of inlet pipe segment 140 is non-removably inserted into first opening 156 of flapper housing 150 with inlet-pipe-outer-periphery 146 frictionally and non-removably contacting first-opening-inner-periphery 158. The pieces may be adhesively slid together using a primer and bonding cement, or can be joined using thermal adhesion from the manufacturer. Inlet pipe segment 140 and outlet pipe segment 180 preferably each comprise a circular cross-section manufactured in standard pipe sizes such that sewage backflow assembly 105 can be easily installed using standard size couplers.

Figure 3:
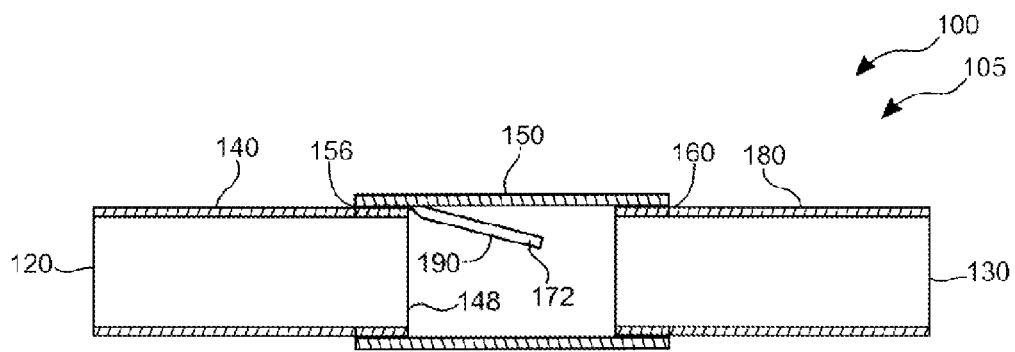
FIG. 3 is a side cutaway view illustrating a closed position of the sewage stopper systems according to an embodiment of the present invention of FIG. 1.

Referring now to FIG. 3, a side cutaway view illustrating a closed position of sewage stopper systems 100 according to an embodiment of the present invention of FIG. 1.

Flapper hinge tab 174 of flapper 170 has hinge portion 176 which is flexible and allows flapper disc 172 to rotate in relation to flapper hinge tab 174. The outer circumference of flapper disc 172 is able to rotate freely and upwardly within the inside volume of flapper housing 150. Flapper disc 172 comprises second contact face 190 and second end 144 of inlet pipe segment 140 comprises first contact face 148. Second contact face 190 hingedly rotates downwardly to contact-seal against first contact face 148. First contact face 148 of inlet pipe segment 140 and second contact face 190 of flapper disc 172 are parallel planar in a sealed position and non-parallel planar in a non-sealed position. First contact face 148 of inlet pipe segment 140 may be cut at a slight angle having the bottom of the cut extending further into flapper housing 150 than the top of the cut to ensure that the weight of flapper disc 172 closes against first contact face 148 in a static condition.

Figure 4:
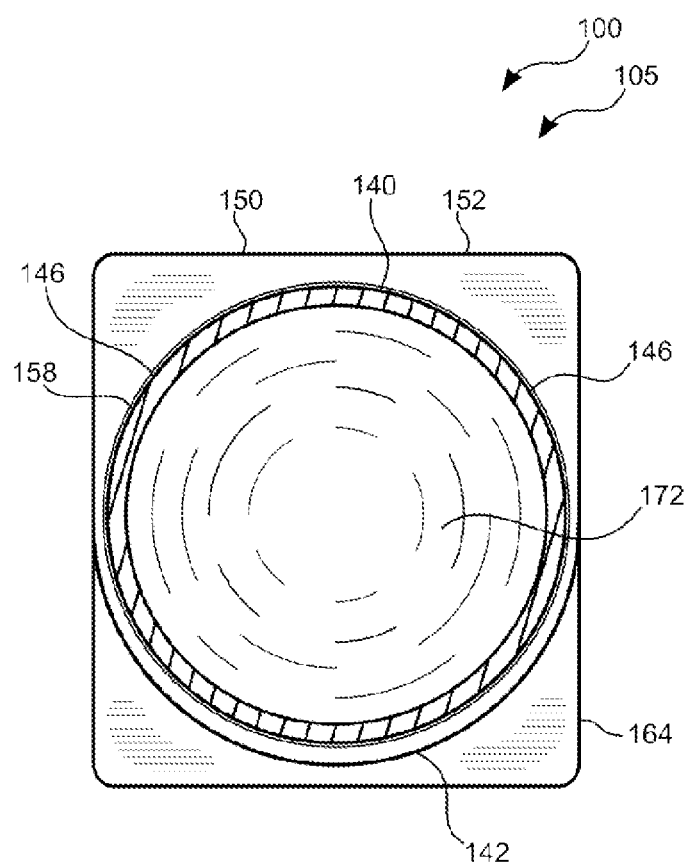
FIG. 4 is an end perspective view illustrating the sewage stopper systems according to an embodiment of the present invention of FIG. 1.

Referring now to FIG. 4, showing an end perspective view illustrating sewage stopper systems 100 according to an embodiment of the present invention of FIG. 1.

Flapper hinge tab 174 is frictionally and non-removably located between inlet-pipe-outer-periphery 146 of inlet pipe segment 140 and first-opening-inner-periphery 158 of first opening 156 of flapper housing 150. The outer periphery of the proximate end of the outlet pipe segment is non-removably inserted within the second-opening-inner-periphery of the flapper housing. Distal end 184 of outlet pipe segment 180 is at the opposite end from proximate end 182. First end 142 of inlet pipe segment 140 and distal end 184 of outlet pipe segment 180 are coupled inline to sewage drain pipe 110 such that flowing sewage water enters through first end 142 of inlet pipe segment 140 of sewage backflow assembly 105 and exits the through distal end 184 of outlet pipe segment 180.

Flapper hinge tab 174 and flapper disc 172 are integral and together form flapper 170, outer circumference 178 of flapper disc 172 being transversely located within the inner diameter of flapper housing 150. Flapper 170 is easily and rotatably-lifted via sewage water flowing from inlet end 120 toward outlet end 130 which opens a cylindrical channel via the lifted flapper 170, to allow the sewage water to flow through sewage backflow assembly 105.

Sewage stopper systems 100 may be sold as kit 440 comprising the following parts: at least one fully assembled sewage backflow assembly 105; and at least one set of user instructions. The kit has instructions such that functional relationships are detailed in relation to the structure of the invention (such that the invention can be used, maintained, or the like in a preferred manner). Sewage stopper systems 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Figure 5:
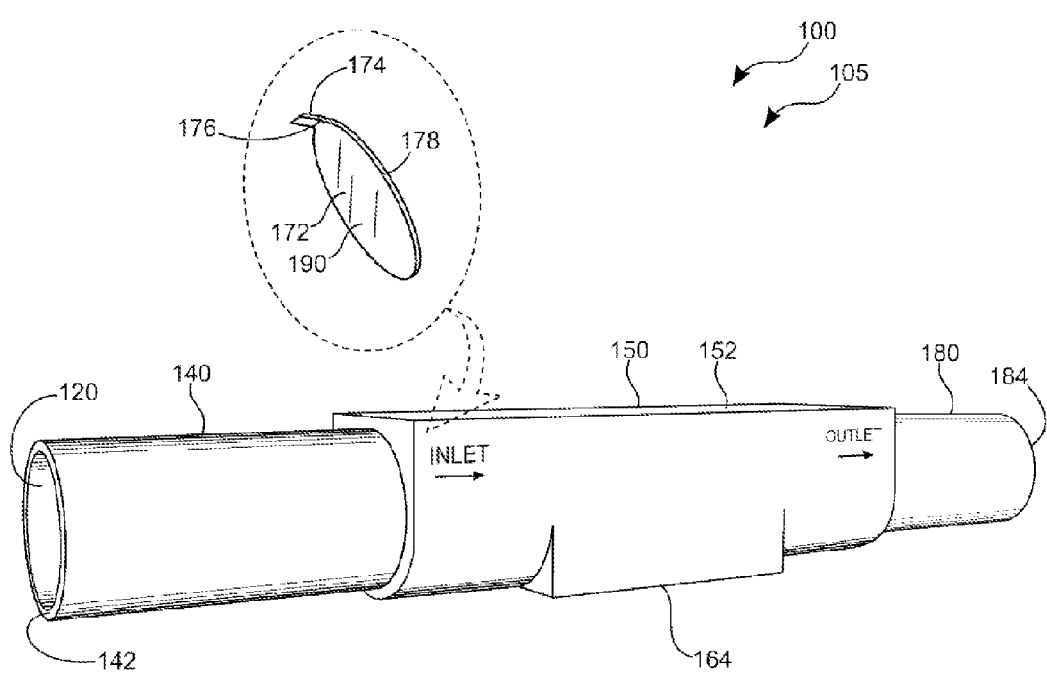
FIG. 5 is a perspective view illustrating a flapper and sewage backflow assembly of sewage stopper systems according to an embodiment of the present invention of FIG. 1.

Referring now to FIG. 5, a perspective view illustrating flapper and sewage backflow assembly 105 of sewage stopper systems 100 according to an embodiment of the present invention of FIG. 1.

The exterior of the end of flapper housing 150 having first opening 156 is flat on top side 152 and semi-circular on bottom side 154. The exterior of the end of flapper housing 150 having second opening 160 is flat on top side 152 and semi-circular on bottom side 154 and central portion 164 of flapper housing 150 may comprise a flat bottom side 154 and a flat top side 152. First end 142 of inlet pipe segment 140 is integral with inlet pipe segment 140 and second end 144, first end 142 at an opposing end from second end 144. Top side 152 of flapper housing 150 is oriented upwardly and opposite from bottom side 154 of flapper housing 150, top side 152 and bottom side 154 being integral with each other and with first opening 156 and second opening 160 of flapper housing 150. Central portion 164 of flapper housing 150 preferably comprises a U-shaped cross-section.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A sewage backflow prevention system comprising:
   a sewage backflow assembly comprising;
      an inlet pipe segment having;
         a first end and a second end;
         an inlet-pipe-outer-periphery; and
      a flapper housing having;
         a top side; and
         a bottom side;
         a first opening having;
            a first-opening-inner-periphery;
         a second opening having;
            a second opening inner periphery; and
         a flapper comprising a flapper disc and a flapper hinge tab;
      an outlet pipe segment having;
         a proximate end and a distal end; and
         an-outlet-pipe-outer-periphery;
   wherein said sewage backflow assembly is able to be installed concentrically in line with a sewage drain pipe to prevent an unintended backflow of a sewage water into an interior of a building;
   wherein said second end of said inlet pipe segment is non-removably inserted into said first opening of said flapper housing, said inlet-pipe-outer-periphery frictionally contacting said first-opening-inner-periphery;
   wherein said first end of said inlet pipe segment is integral with said inlet pipe segment and second end, said first end at an opposing end from said second end;
   wherein said top side of said flapper housing is oriented upwardly and opposite from said bottom side of said flapper housing, said top side and said bottom side being integral with each other and said first opening and said second opening of said flapper housing;
   wherein said flapper hinge tab and said flapper disc are integral, an outer circumference of said flapper disc transversely located within an inner diameter of said flapper housing;
   wherein said flapper hinge tab is frictionally and non-removably located between said inlet-pipe-outer-periphery of said inlet pipe segment and said first-opening-inner-periphery of said first opening of said flapper housing wherein said flapper hinge tab has a first face in contact with said inlet-pipe outer periphery and wherein said flapper hinge tab has a second face in contact with said first-opening inner periphery;
   wherein an outer periphery of said proximate end of said outlet pipe segment is non-removably inserted within said second-opening-inner-periphery of said flapper housing;
   wherein said distal end of said outlet pipe segment is at an opposite end from said proximate end;
   wherein said first end of said inlet pipe segment and said distal end of said outlet pipe segment are coupled inline to said sewage drain pipe such that a flowing said sewage water enters through said first end of said inlet pipe segment of said sewage backflow assembly and exits said through said distal end of said outlet pipe segment; and
   wherein said sewage backflow assembly is useful for installing in-line within said sewage drain pipe, said sewage backflow assembly able to prevent a backflow of said sewage water within said sewage drain pipe having said sewage backflow assembly.

2. The sewage backflow prevention system of claim 1 wherein a central portion of said flapper housing comprises a u-shaped cross-section.

3. The sewage backflow prevention system of claim 1 wherein said flapper disc comprises a second contact face and said second end of said inlet pipe segment comprises a first contact face, said second contact face hingedly rotates downwardly to contact-seal against said first contact face.

4. The sewage backflow prevention system of claim 1 wherein said inlet pipe segment and said outlet pipe segment each comprise a circular cross-section.

5. The sewage backflow prevention system of claim 1 wherein said outer circumference of said flapper disc is able to rotate freely and upwardly within an inside volume of said flapper housing.

6. The sewage backflow prevention system of claim 3 wherein said first contact face of said inlet pipe segment and said second contact face of said flapper disc are parallel planar in a sealed position and non-parallel planar in a non-sealed position.

7. The sewage backflow prevention system of claim 1 wherein said sewage backflow assembly comprises ABS plastic.

8. The sewage backflow prevention system of claim 7 wherein said sewage backflow assembly is able to be adhesively and non-removably inserted into said sewage drain pipe.

9. The sewage backflow prevention system of claim 7 wherein said sewage backflow assembly is able to be removably coupled within said sewage drain pipe using re-usable pipe couplers.

10. The sewage backflow prevention system of claim 1 wherein an exterior of said end of said flapper housing having said first opening comprises a flat said top side and a semi-circular said bottom side.

11. The sewage backflow prevention system of claim 1 wherein an exterior of said end of said flapper housing having said second opening comprises a flat said top side and semi-circular said bottom side.

12. The sewage backflow prevention system of claim 1 wherein said central portion of said flapper housing comprises a flat said bottom side and a flat said top side.

13. The sewage backflow prevention system of claim 1 wherein said flapper is easily and rotatably-lifted via a flowing said sewage water from an inlet end toward an out end to open a cylindrical channel to allow said sewage water to flow through said sewage backflow assembly.

14. The sewage backflow prevention system of claim 1 wherein said flapper hinge tab of said flapper comprises a hinge portion, said hinge portion being flexible and allowing said flapper disc to rotate in relation to said flapper hinge tab.

15. The sewage backflow prevention system of claim 1 wherein said sewage backflow assembly comprises PVC plastic.

16. The sewage backflow prevention system of claim 1 wherein said sewage backflow assembly is about 5 inches in diameter.

17. The sewage backflow prevention system of claim 1 wherein said sewage backflow assembly is about 14 inches in length.

18. The sewage backflow prevention system of claim 1 wherein said sewage backflow assembly is about 4 inches in width.

19. A sewage backflow prevention system comprising:
a sewage backflow assembly comprising;
an inlet pipe segment having;
a first end and a second end;
an inlet-pipe-outer-periphery; and
a flapper housing having;
a top side; and
a bottom side;
a first opening having;
a first-opening-inner-periphery;
a second opening having;
a second opening inner periphery; and
a flapper comprising a flapper disc and a flapper hinge tab;
an outlet pipe segment having;
a proximate end and a distal end; and
an-outlet-pipe-outer-periphery;
wherein said sewage backflow assembly is able to be installed concentrically in line with a sewage drain pipe to prevent an unintended backflow of a sewage water into an interior of a building;
wherein said sewage backflow assembly is about 5 inches in diameter;
wherein said sewage backflow assembly is about 14 inches in length;
wherein said sewage backflow assembly is about 4 inches in width;
wherein said second end of said inlet pipe segment is non-removably inserted into said first opening of said flapper housing, said inlet-pipe-outer-periphery frictionally contacting said first-opening-inner-periphery;
wherein said inlet pipe segment and said outlet pipe segment each comprise a circular cross-section;
wherein an exterior of said end of said flapper housing having said first opening comprises a flat said top side and a semi-circular said bottom side;
wherein an exterior of said end of said flapper housing having said second opening comprises a flat said top side and semi-circular said bottom side;
wherein a central portion of said flapper housing comprises a flat said bottom side and a flat said top side;
wherein said first end of said inlet pipe segment is integral with said inlet pipe segment and said second end, said first end at an opposing end from said second end;
wherein said top side of said flapper housing is oriented upwardly and opposite from said bottom side of said flapper housing, said top side and said bottom side being integral with each other and with said first opening and said second opening of said flapper housing;
wherein a central portion of said flapper housing comprises a u-shaped cross-section;
wherein said flapper hinge tab and said flapper disc are integral, an outer circumference of said flapper disc transversely located within an inner diameter of said flapper housing;
wherein said flapper is easily and rotatably-lifted via a flowing said sewage water from an inlet end toward an out end to open a cylindrical channel to allow said sewage water to flow through said sewage backflow assembly;
wherein said flapper hinge tab of said flapper comprises a hinge portion, said hinge portion being flexible and allowing said flapper disc to rotate in relation to said flapper hinge tab;
wherein said outer circumference of said flapper disc is able to rotate freely and upwardly within an inside volume of said flapper housing;
wherein said flapper disc comprises a second contact face and said second end of said inlet pipe segment comprises a first contact face, said second contact face hingedly rotates downwardly to contact-seal said first contact face;
wherein said first contact face of said inlet pipe segment and said second contact face of said flapper disc are parallel planar in a sealed position and non-parallel planar in a non-sealed position;
wherein said flapper hinge tab is frictionally and non-removably located between said inlet-pipe-outer-periphery of said inlet pipe segment and said first-opening-inner-periphery of said first opening of said flapper housing wherein said flapper hinge tab has a first face in contact with said inlet-pipe outer periphery and wherein said flapper hinge tab has a second face in contact with said first-opening inner periphery;
wherein an outer periphery of said proximate end of said outlet pipe segment is non-removably inserted within said second-opening-inner-periphery of said flapper housing;
wherein said distal end of said outlet pipe segment is at an opposite end from said proximate end;
wherein said first end of said inlet pipe segment and said distal end of said outlet pipe segment are coupled inline to said sewage drain pipe such that a flowing said sewage water enters through said first end of said inlet pipe segment of said sewage backflow assembly and exits said through said distal end of said outlet pipe segment;
wherein said sewage backflow assembly is able to be adhesively and non-removably inserted into said sewage drain pipe;
wherein said sewage backflow assembly comprises PVC plastic;
wherein said sewage backflow assembly comprises ABS plastic;
wherein said sewage backflow assembly is able to be removably coupled within said sewage drain pipe using re-usable pipe couplers; and
wherein said sewage backflow assembly is useful for installing in-line within said sewage drain pipe, said sewage backflow assembly able to prevent a backflow of said sewage water within said sewage drain pipe having said sewage backflow assembly.

20. The sewage backflow prevention system of claim 19 further comprising a kit including:

at least one fully said assembled sewage backflow assembly; and at least one set of user installation instructions.

\* \* \* \* \*